(12) United States Patent
Kojima et al.

(10) Patent No.: US 9,010,304 B2
(45) Date of Patent: Apr. 21, 2015

(54) EXHAUST GAS RECIRCULATION DEVICE OF ENGINE

(75) Inventors: Yuji Kojima, Hiroshima (JP); Tomohiro Sunada, Hiroshima (JP); Daijiro Ishimoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 979 days.

(21) Appl. No.: 13/162,238

(22) Filed: Jun. 16, 2011

(65) Prior Publication Data
US 2011/0315129 A1   Dec. 29, 2011

(30) Foreign Application Priority Data

Jun. 25, 2010  (JP) ................................. 2010-144513
Apr. 20, 2011  (JP) ................................. 2011-094205

(51) Int. Cl.
F02B 47/08   (2006.01)
F02M 25/07   (2006.01)
F02F 1/24    (2006.01)

(52) U.S. Cl.
CPC ............ F02F 1/243 (2013.01); F02M 25/0747 (2013.01); F02M 25/0715 (2013.01); F02M 25/0726 (2013.01); F02M 25/0717 (2013.01); F02M 25/0722 (2013.01); F02M 25/0728 (2013.01); Y02T 10/121 (2013.01)

(58) Field of Classification Search
USPC .................. 123/58.8, 568.12, 568.13, 568.17, 123/568.18, 568.11
See application file for complete search history.

(56) References Cited

U.S. PATENT DOCUMENTS

| | | | | |
|---|---|---|---|---|
| 3,937,194 A | * | 2/1976 | Tamaki et al. ............ | 123/568.13 |
| 4,106,449 A | * | 8/1978 | Matsumoto et al. ...... | 123/568.12 |
| 4,147,031 A | * | 4/1979 | Tanuma et al. ................. | 60/278 |
| 4,194,472 A | * | 3/1980 | Amano et al. ................ | 123/274 |
| 4,237,826 A | * | 12/1980 | Motosugi et al. ............ | 123/25 R |
| 4,261,316 A | * | 4/1981 | Motosugi et al. ............. | 123/547 |
| 4,271,810 A | * | 6/1981 | Lancaster ...................... | 123/275 |
| 4,323,045 A | * | 4/1982 | Yamashita ............... | 123/568.12 |
| 4,328,781 A | * | 5/1982 | Morita ..................... | 123/568.12 |

(Continued)

FOREIGN PATENT DOCUMENTS

| | | |
|---|---|---|
| CN | 201420627 Y | 3/2010 |
| EP | 2077387 A1 | 7/2009 |

(Continued)

OTHER PUBLICATIONS

An Office Action issued by the German Patent and Trade Mark Office on May 31, 2013, which corresponds to German Application No. 10 2011 103 626.5 and is related to U.S. Appl. No. 13/162,238; with translation.

*Primary Examiner* — Stephen K Cronin
*Assistant Examiner* — Brian Kirby
(74) *Attorney, Agent, or Firm* — Studebaker & Brackett PC

(57) ABSTRACT

A connecting passage is formed inside a cylinder head, which extends rearward from an exhaust passage and connects to the exhaust passage. The connecting passage branches inside the cylinder head into two branch passages, which open at a rear end face of the cylinder head, respectively. An opening portion, one of opening portions of the branch passages, connects to an EGR cooler, and another opening portion, the other of opening portions of the branch passages, connects to a bypass pipe. Accordingly, the exhaust gas recirculation device of an engine which can restrain the device from being improperly large sized, providing the EGR cooler and the bypass pipe, can be provided.

4 Claims, 14 Drawing Sheets

(56) References Cited

U.S. PATENT DOCUMENTS

| | | | |
|---|---|---|---|
| 4,367,719 A * | 1/1983 | Kimura et al. | 123/568.17 |
| 4,422,430 A * | 12/1983 | Wiatrak | 123/568.13 |
| 4,643,157 A * | 2/1987 | Nishikawa et al. | 123/568.13 |
| 4,782,797 A * | 11/1988 | Kurahashi | 123/184.35 |
| 5,209,209 A * | 5/1993 | Karlsson et al. | 123/568.17 |
| 5,490,488 A * | 2/1996 | Aversa et al. | 123/568.12 |
| 5,662,079 A * | 9/1997 | Snider | 123/188.14 |
| 5,690,081 A * | 11/1997 | Kwiatkowski | 123/568.12 |
| 5,690,082 A * | 11/1997 | Tanioka et al. | 123/568.12 |
| 5,732,688 A * | 3/1998 | Charlton et al. | 123/568.12 |
| 5,762,051 A * | 6/1998 | Okamoto | 123/568.18 |
| 5,839,417 A * | 11/1998 | Kwiatkowski et al. | 123/568.13 |
| 5,979,421 A * | 11/1999 | Yamashita et al. | 123/568.12 |
| RE36,500 E * | 1/2000 | Ando et al. | 123/193.4 |
| 6,164,269 A * | 12/2000 | Feucht et al. | 123/568.11 |
| 6,237,547 B1 | 5/2001 | Ishiyama | 123/41.31 |
| 6,311,677 B1 * | 11/2001 | Cook et al. | 123/568.12 |
| 6,386,188 B1 * | 5/2002 | Bender | 123/568.12 |
| 6,470,865 B2 * | 10/2002 | Iizuka et al. | 123/568.13 |
| 6,478,017 B2 * | 11/2002 | Bianchi | 123/568.12 |
| 6,513,506 B1 * | 2/2003 | Ito et al. | 123/568.13 |
| 6,615,796 B2 * | 9/2003 | Iizuka et al. | 123/310 |
| 6,672,296 B2 * | 1/2004 | Ito et al. | 123/672 |
| 6,895,948 B2 * | 5/2005 | Mori et al. | 123/568.17 |
| 6,971,378 B2 * | 12/2005 | Mackey et al. | 123/568.13 |
| 6,976,480 B2 * | 12/2005 | Miyoshi et al. | 123/568.12 |
| 7,069,918 B2 * | 7/2006 | Mackey et al. | 123/568.12 |
| 7,275,526 B2 * | 10/2007 | Sugimoto et al. | 123/568.12 |
| 7,810,466 B2 * | 10/2010 | Preimesberger et al. | 123/195 A |
| 7,926,471 B2 * | 4/2011 | Freese, V | 123/568.12 |
| 8,210,157 B2 * | 7/2012 | Sohn et al. | 123/568.13 |
| 8,225,773 B2 * | 7/2012 | Gruner et al. | 123/568.12 |
| 2003/0098005 A1 | 5/2003 | Ito et al. | |
| 2007/0017489 A1 * | 1/2007 | Kuroki et al. | 123/568.12 |
| 2007/0186536 A1 | 8/2007 | Hashizume | |
| 2008/0223329 A1 * | 9/2008 | Preimesberger et al. | 123/195 A |
| 2009/0084920 A1 * | 4/2009 | Cerabone et al. | 248/309.1 |
| 2010/0139632 A1 * | 6/2010 | Sohn et al. | 123/568.18 |
| 2011/0088664 A1 * | 4/2011 | Leroux et al. | 123/542 |
| 2011/0315129 A1 * | 12/2011 | Kojima et al. | 123/568.12 |
| 2013/0206121 A1 * | 8/2013 | Nishikawa | 123/568.13 |

FOREIGN PATENT DOCUMENTS

| | | | |
|---|---|---|---|
| EP | 2077388 A2 * | 7/2009 | F02M 25/07 |
| JP | 2002-285915 A | 10/2002 | |

* cited by examiner

EXHAUST GAS RECIRCULATION DEVICE OF ENGINE

BACKGROUND OF THE INVENTION

The present invention relates to an exhaust gas recirculation device of an engine, which recirculates part of exhaust gas discharged from an exhaust passage provided inside a cylinder head of an engine body having plural cylinders arranged in line in a longitudinal direction to an intake system of the engine body.

Conventionally, it has been done to recirculate part of exhaust gas to an intake system and decrease the temperature of combustion gas with the recirculated EGR gas to reduce an emission of NOx. In general, a device in which part of the exhaust gas is recirculated to the intake system from an exhaust manifold which is connected to a cylinder head outside the cylinder head through an EGR passage provided outside the cylinder head is known as the above-described exhaust gas recirculation device to recirculate part of the exhaust gas, i.e., EGR gas, to the intake system. Further, as disclosed in Japanese Patent Laid-Open Publication No. 2002-285915, a device in which an EGR passage to recirculate the EGR gas is formed inside the cylinder head and the EGR gas is recirculated to the intake system through this EGR passage has been developed as well. This device may make the device compact overall.

In the device disclosed in the above-described patent document, the high-temperature EGR gas is directly recirculated to the intake system. Accordingly, according to this device, under a certain driving condition in which the combustion is unstable at an engine start, a low engine temperature or the like, the temperature of intake air is so increased that the combustion can be stabilized. Under the other condition, however, the intake temperature may rise excessively, so that there is a problem in that the amount of fresh intake air flowing into cylinders would decrease improperly. For this problem, it may be considered that an EGR cooler to cool the EGR gas and a bypass pipe to allow the EGR gas to bypass the EGR cooler are provided, and two cases in which the EGR gas passes through the EGR cooler to cool the EGR gas or the EGR gas flows bypassing the EGR cooler to keep its high temperature are selectable according to the driving conditions. In this case, however, there is another problem in that the device would become improperly large sized due to providing the EGR cooler and the bypass pipe.

SUMMARY OF THE INVENTION

The present invention has been devised in view of the above-described matter, and an object of the present invention is to provide an exhaust gas recirculation device of an engine which can restrain the device from being improperly large sized, even providing the EGR cooler and the bypass pipe.

According to the present invention, there is provided an exhaust gas recirculation device of an engine, which recirculates part of exhaust gas discharged from an engine body having plural cylinders arranged in line in a longitudinal direction to an intake system of the engine body, comprising an exhaust passage provided inside a cylinder head of the cylinder body, a connecting passage provided inside the cylinder head to connect to and extend rearward from the exhaust passage, an EGR cooler cooling part of the recirculated exhaust gas to the intake system from the exhaust passage, a bypass pipe bypassing the EGR cooler and recirculating the exhaust gas from the exhaust passage to the intake system, wherein the connecting passage branches inside the cylinder head into two branch passages, which open at a rear end face of the cylinder head, respectively, and one of opening portions of the branch passages connects to the EGR cooler, and the other of opening portions of the branch passages connects to the bypass pipe.

According to the present invention, the two branch passages branching from the exhaust passage are formed inside the cylinder head, the respective opening portions of the two branch passages are formed at the rear end face of the cylinder head, and the EGR cooler and the bypass pipe are directly attached to the cylinder head. Accordingly, the size of the device can be made smaller, compared to a case in which respective pipes to supply the exhaust gas from the exhaust passage to the EGR cooler and the bypass pipe are provided outside the cylinder head and the EGR cooler and the bypass pipe are attached to the respective pipes outside the cylinder head. Further, attachment of the EGR cooler and the bypass pipe can be easier.

According to an embodiment of the present invention, the opening portion of the branch passage connecting to the EGR cooler is formed at a position which is further away from the intake system of the engine body, compared to the opening portion of the branch passage connecting to the bypass pipe. Thereby, the distance from the opening portion connecting to the EGR cooler to the intake system can be properly long and thus the sufficiently-large volume of the EGR cooler provided between these can be ensured. The sufficiently-large volume of the EGR cooler can provide the sufficient heat-exchanging amount of the EGR cooler as well, so that the EGR gas can be cooled properly. Further, the distance from the opening portion connecting to the bypass pipe to the intake system can be properly short and thus the distance between the bypass pipe and the intake system can be properly short. This arrangement can suppress the amount of radiation of heat of the EGR gas flowing down through the bypass pipe to the intake system, so that the high-temperature EGR gas can be surely recirculated to the intake system.

According to another embodiment of the present invention, the EGR cooler extends in an engine-body width direction from a vicinity of the opening portion of the branch passage connecting to the EGR cooler toward the intake system arranged on one side of the engine body in the engine-body width direction. Thereby, the mount of rearward projection of the EGR cooler can be suppressed to provide compact arrangement of the EGR cooler, ensuring the sufficient heat-exchanging amount of the EGR cooler.

According to another embodiment of the present invention, the opening portions of the two branch passages are positioned at different levels from each other, and the EGR cooler and the bypass pipe extend in parallel to and vertically away from each other. Thereby, by arranging the EGR cooler and the bypass pipe from the opening portions along the engine-body width direction, the EGR cooler and the bypass pipe can be disposed in parallel to each other, so that the mount of rearward projection of the bypass pipe can be suppressed to be properly small in addition to the EGR cooler.

According to another embodiment of the present invention, the EGR cooler comprises an EGR cooler body extending in the engine-body width direction, an exhaust introduction portion provided at one end of the EGR cooler body in a longitudinal direction and introducing the exhaust gas into an inside of the EGR cooler body, and an exhaust discharge portion provided at the other end of the EGR cooler body in the longitudinal direction and discharging the exhaust gas inside the EGR cooler body to the intake system, and the exhaust introduction portion is connected to the opening portion. Thereby, the distance between the exhaust discharge portion of the EGR cooler and the intake system can be properly small to shorten the pipe between the EGR cooler and the intake system, ensuring the sufficiently-large heat-exchanging volume of the EGR cooler. This can make the device properly small-sized and simple.

According to another embodiment of the present invention, the exhaust gas recirculation device further comprises an EGR-gas passage structural portion formed at an intake manifold connected to the engine body, and the EGR cooler and the bypass pipe are supported at the EGR-gas passage structural portion. Thereby, the support rigidity of the device can be ensured and the support structure can be properly simple.

Other features, aspects, and advantages of the present invention will become apparent from the following description which refers to the accompanying drawings.

DETAILED DESCRIPTION OF THE INVENTION

Figure 1:
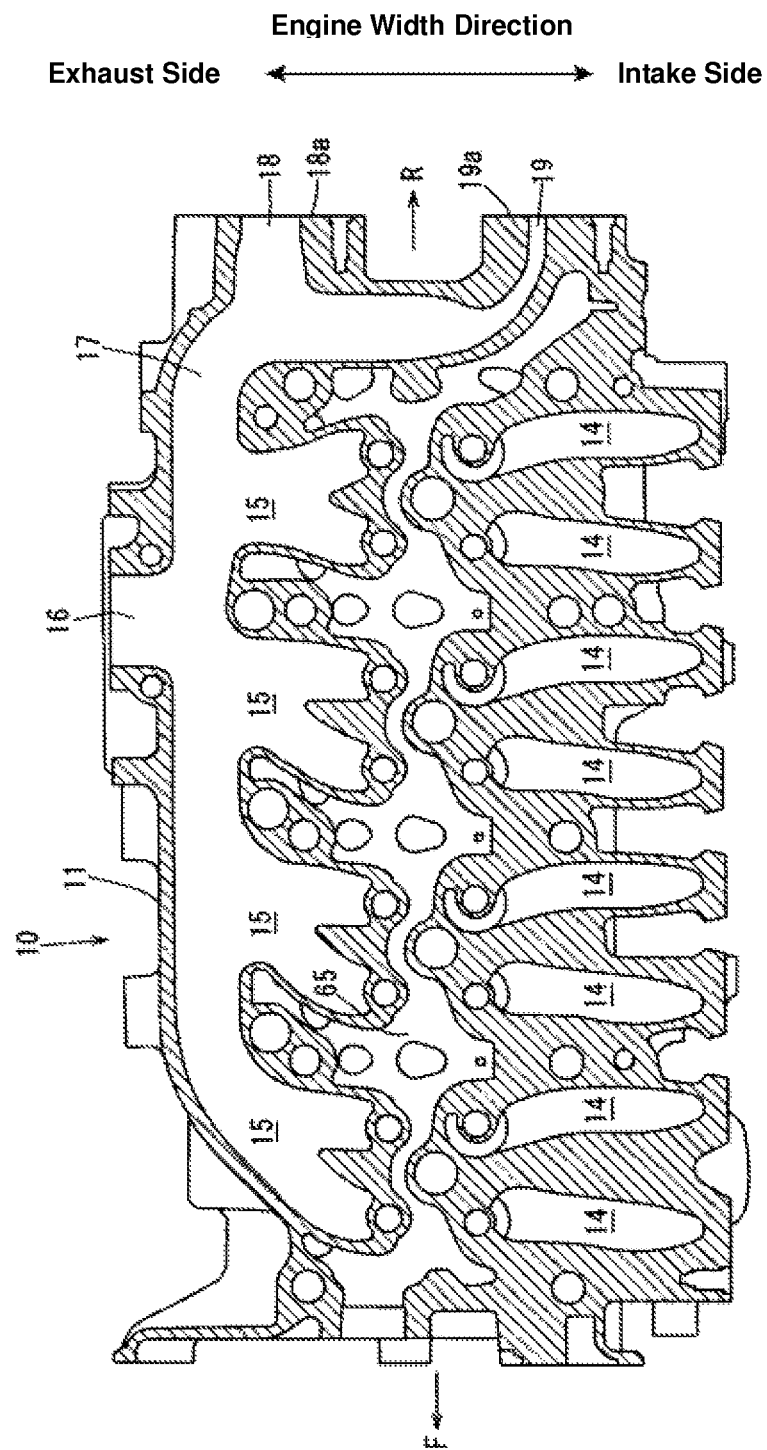
FIG. 1 is a plan view of a cylinder head.

Hereafter, a preferred embodiment of an exhaust gas recirculation device of an engine according to the present invention will be descried referring to the drawings.

Figure 11:
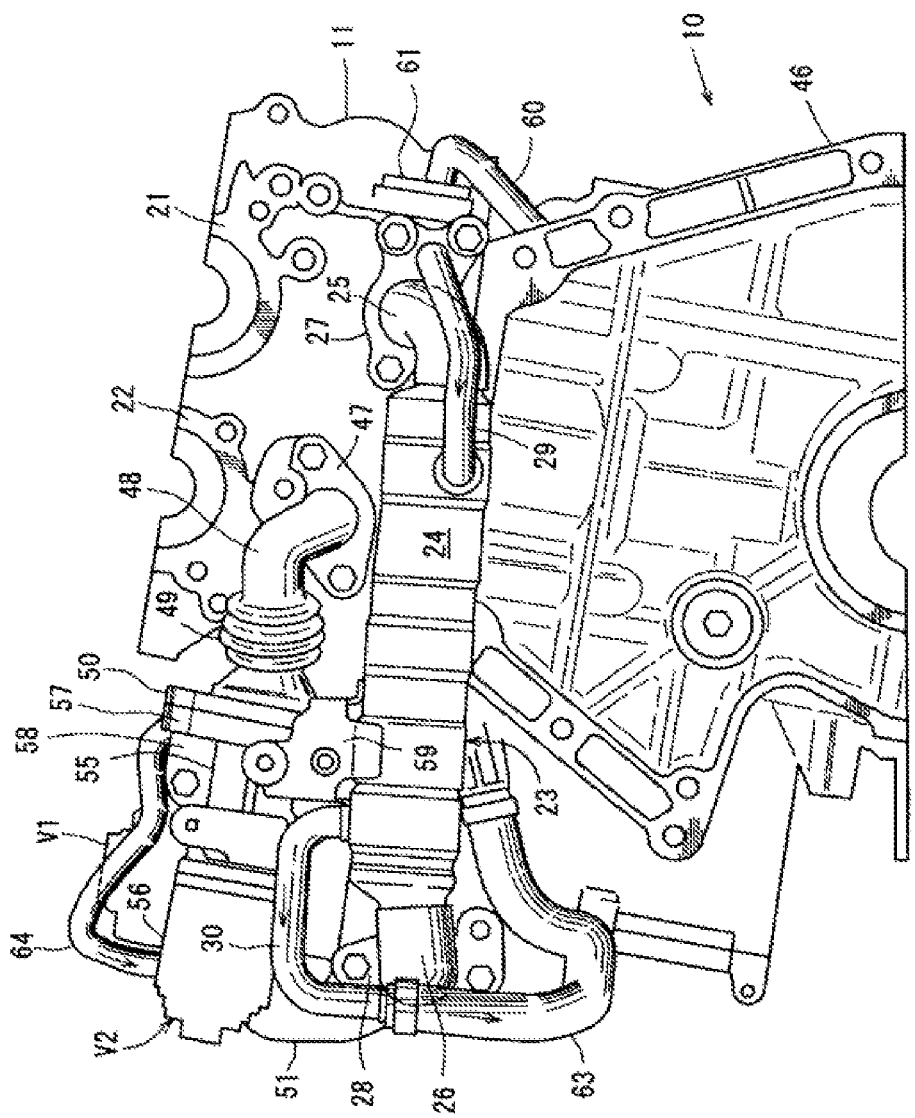
FIG. 11 is a back view showing the exhaust gas recirculation device of an engine.

The exhaust gas recirculation device of an engine is attached to an engine body 10. As shown in FIG. 11 and others, the engine body 10 comprises a cylinder head 11, a cylinder block 46 which is fixed to the cylinder head 11, and a cylinder head cover, not illustrated, which is attached to a specified portion of the cylinder head on the opposite side to the cylinder block 46. Hereafter, the direction of row of the cylinder head 11 and the cylinder block 46 will be referred to as the vertical direction, the side of the cylinder head 11 will be referred to as the upper side, and the side of the cylinder block 46 will be referred to as the lower side.

Figure 10:
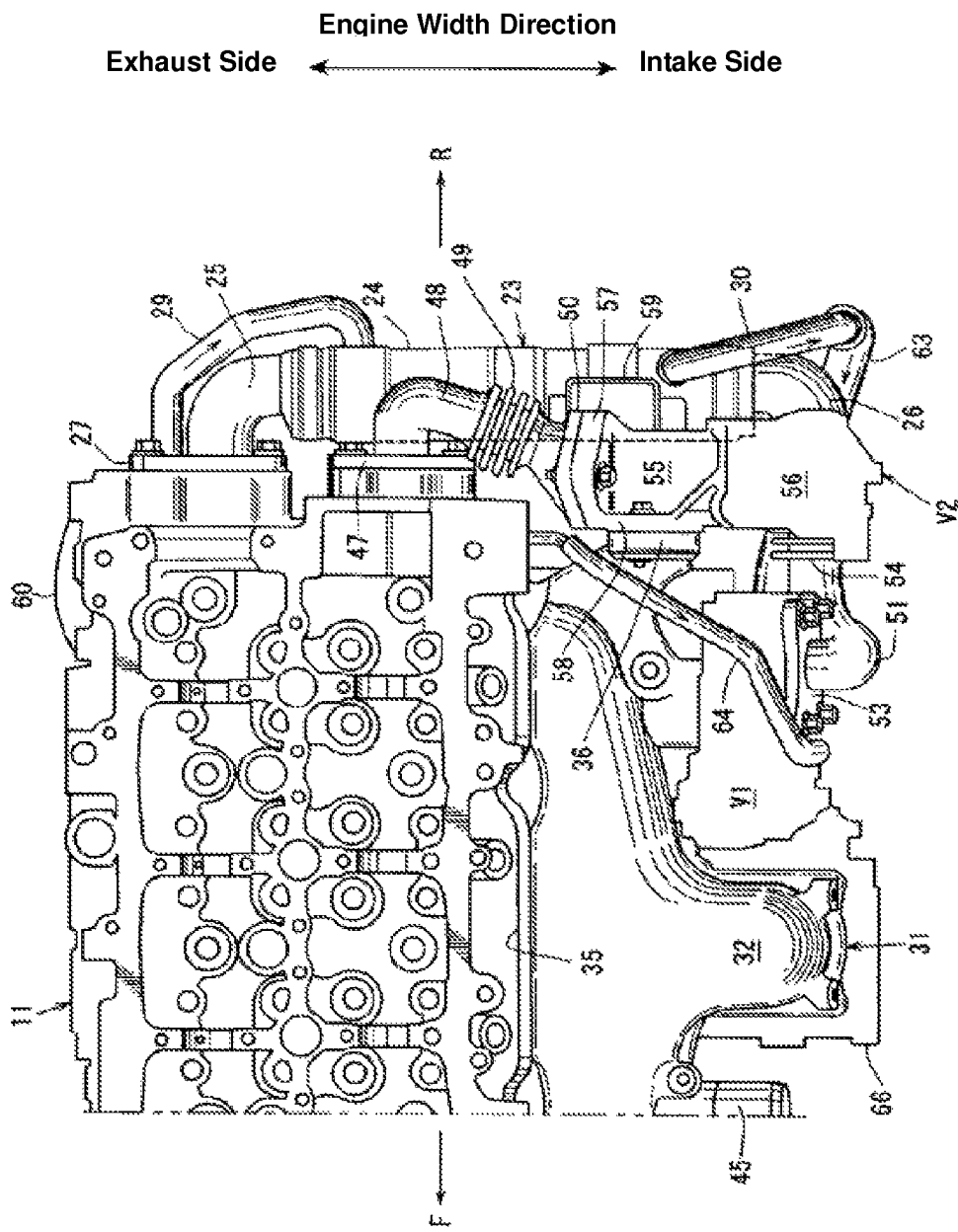
FIG. 10 is a plan view showing the exhaust gas recirculation device of an engine.

The exhaust gas recirculation device of an engine according to the present invention recirculates part of exhaust gas discharged from the engine body 10, i.e., EGR gas, to an intake manifold (intake system) 31 of the engine body 10 (see FIG. 10). The exhaust gas recirculation device of an engine, as shown in FIG. 10, comprises an EGR cooler 23 to cool the EGR gas and a bypass pipe 48 to recirculate the EGR to the intake system, bypassing the EGR cooler 23. The EGR cooler 23 is a water-cooled type, in which the EGR gas introduced into the inside thereof is cooled by the cooling water introduced therein.

Figure 2:
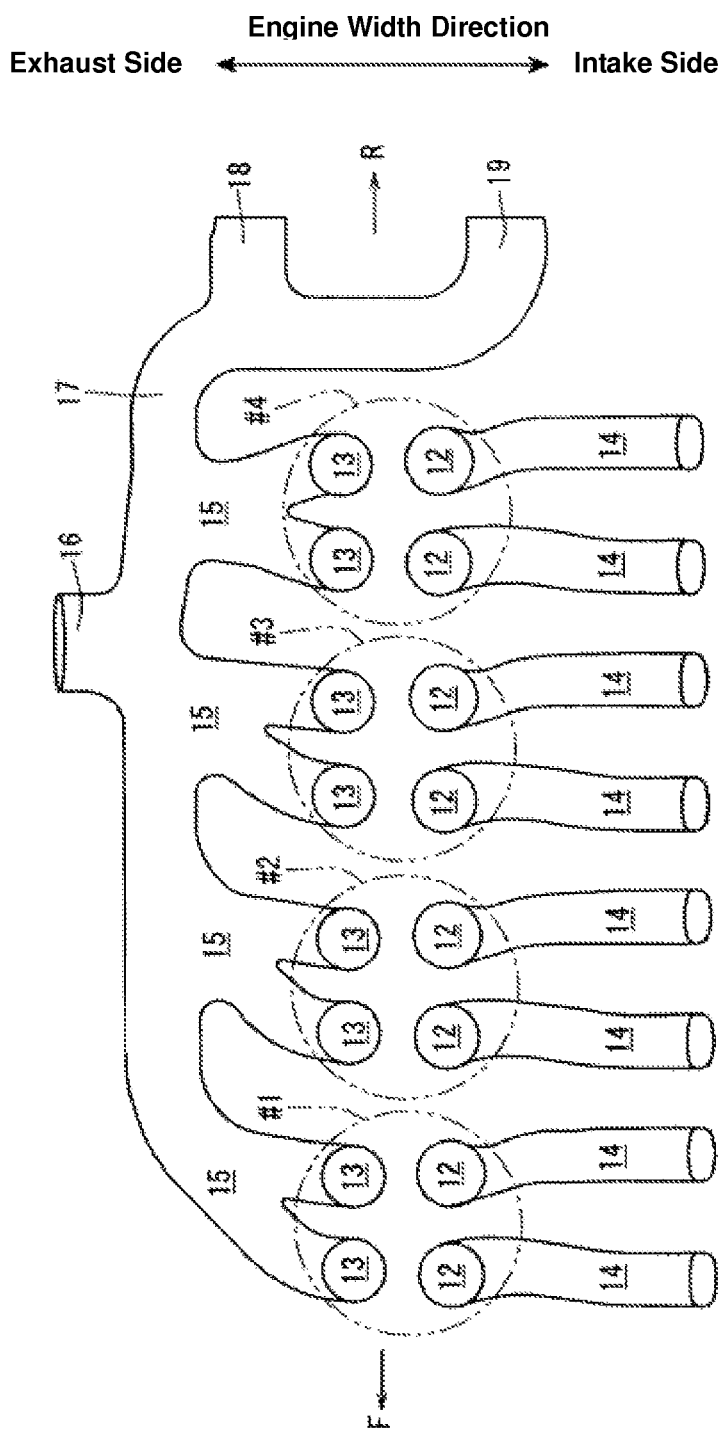
FIG. 2 is a plan view showing constitution of intake ports, exhaust ports, and two opening portions for EGR.

FIG. 1 is a plan view showing constitution of intake ports and exhaust ports which are formed at the cylinder head. FIG. 2 is a plan view showing the intake ports and the exhaust ports. In the figures, an arrow F shows a direction of the engine front side, and an arrow R shows a direction of the engine rear side.

The engine body 10 according to the present embodiment is an inline four-cylinder diesel engine. That is, the engine body 10, as shown by broken lines in FIG. 2, has a first cylinder #1, a second cylinder #2, a third cylinder #3, and a fourth cylinder #4, which are formed in the longitudinal direction.

The engine body 10 according to the present embodiment is a two-intake-valve and two-exhaust-valve type of engine. That is, as shown in FIG. 2, at the cylinder head 11 of the engine body 10 are formed two intake-valve openings 12, 12 and two exhaust-valve openings 13, 13 for each cylinder.

Each intake opening 12 connects to each independent intake port 14. The two exhaust-valve openings 13, 13 formed for each cylinder connect to a common intake port 15 which is of a Y shape in the plan view.

As shown in FIGS. 1 and 2, an exhaust collective portion 16 is formed at a portion of the cylinder head 11 between the third cylinder #3 and the fourth cylinder #4. The exhaust collective portion 16 connects to the Y-shaped exhaust ports 15. Herein, an exhaust pipe is connected to a downstream side of the exhaust collective portion 16 outside the cylinder head 11.

The above-described exhaust port 15 and exhaust collective portion 16 constitute an exhaust passage. This exhaust passage is formed at a one-side portion of the cylinder head 11 in the width direction (which is perpendicular to the longitudinal direction and the vertical direction).

The intake ports 14 are connected to an intake manifold 31, which is provided at the other-side portion of the cylinder head 11 in the width direction. Hereafter, in the width direction of the cylinder head 11, the side where the exhaust passage is formed will be referred to as the exhaust side, and the opposite side will be referred to as the intake side.

Further, at the cylinder head 11 is formed a connecting passage 17 which branches from the exhaust port 15 of the fourth cylinder #4 at the rearmost end of the cylinder head 11. The connecting passage 17 extends rearward from the exhaust port 15, and then branches into two branch passages inside the cylinder head 11. The two branch passages extend further rearward from the branch point and open at a rear end face of the cylinder head 11. That is, at the rear end face of the cylinder head 11 are formed opening portions 18, 19 at which the two branch passages open, respectively. The opening portions 18, 19 are away from each other in the engine width direction. In the present embodiment, the opening portion 18 is formed at a specified position of the rear end face of the cylinder head 11 which is located on the exhaust side relative to the center in the width direction. The other opening portion 19 is formed at another specified position of the rear end face of the cylinder head 11 which is located on the intake side relative to the center in the width direction.

The two branch passages extend respectively toward the opening portions 18, 19. That is, a branch passage 17a extends engine-rearward from the branch point, and another branch passage 17b extends toward the intake side from the branch point and then extends engine-rearward.

The opening portion (for EGR cooler) 18 positioned on the exhaust side introduces part of the exhaust gas to the EGR cooler 23 from the exhaust passage via the connecting passage 17 and the branch passage 17a. The other opening portion (for bypass) 19 introduces part of the exhaust gas to the bypass pipe 48 from the exhaust passage via the connecting passage 17 and the other branch passage 17b. Thus, the EGR gas, part of the exhaust gas discharged from the cylinders, flows into the EGR cooler 23 or the bypass pipe 48 from the opening portions 18, 19, passing through the connecting passage 17 and the branch passages 17a, 17b.

Figure 3:
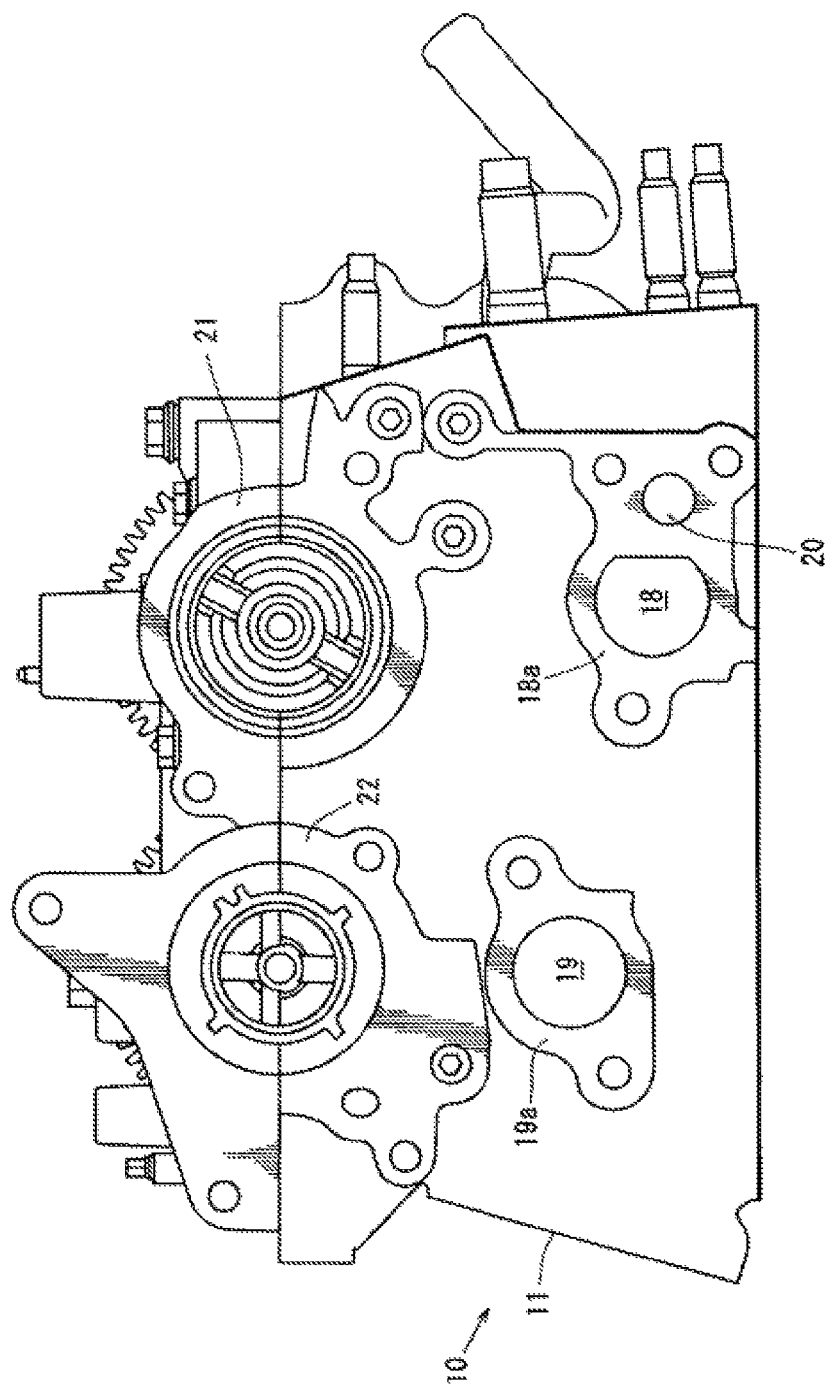
FIG. 3 is a back view of the cylinder head.

FIG. 3 is a back view of the cylinder head 11. As shown in FIG. 3, the opening portion for EGR cooler 18 and the opening portion for bypass 19 are positioned away from each other in the engine width direction and located at different levels from each other. Specifically, the opening portion for bypass 19 positioned on the intake side is located above the level of the opening portion for EGR cooler positioned on the exhaust side. Flanges 18a, 19a are integrally formed at opening edges of the respective opening portions 18, 19.

Further, one end of a relay water passage 20 (see FIG. 14) opens at a specified position of the rear end face of the cylinder head 11 which is located on the exhaust side relative to the opening portion for EGR cooler 18. The engine cooling water flows down through the relay water passage 20. This opening portion connects to the EGR cooler 23, and the cooling water inside the relay water passage 20 is introduced into the EGR cooler 23 via this opening portion.

Further, at the rear end face of the cylinder head 11 are formed an attachment seat 21 to attach a fuel pump (not illustrated) and another attachment seat 22 to attach a vacuum pump (not illustrated). Moreover, as shown in FIG. 1, a water jacket 65 where the cooling water flows is formed inside the cylinder head 11.

Next, the constitution of the EGR cooler 23 will be described referring to FIGS. 4 and 5.

Figure 4:
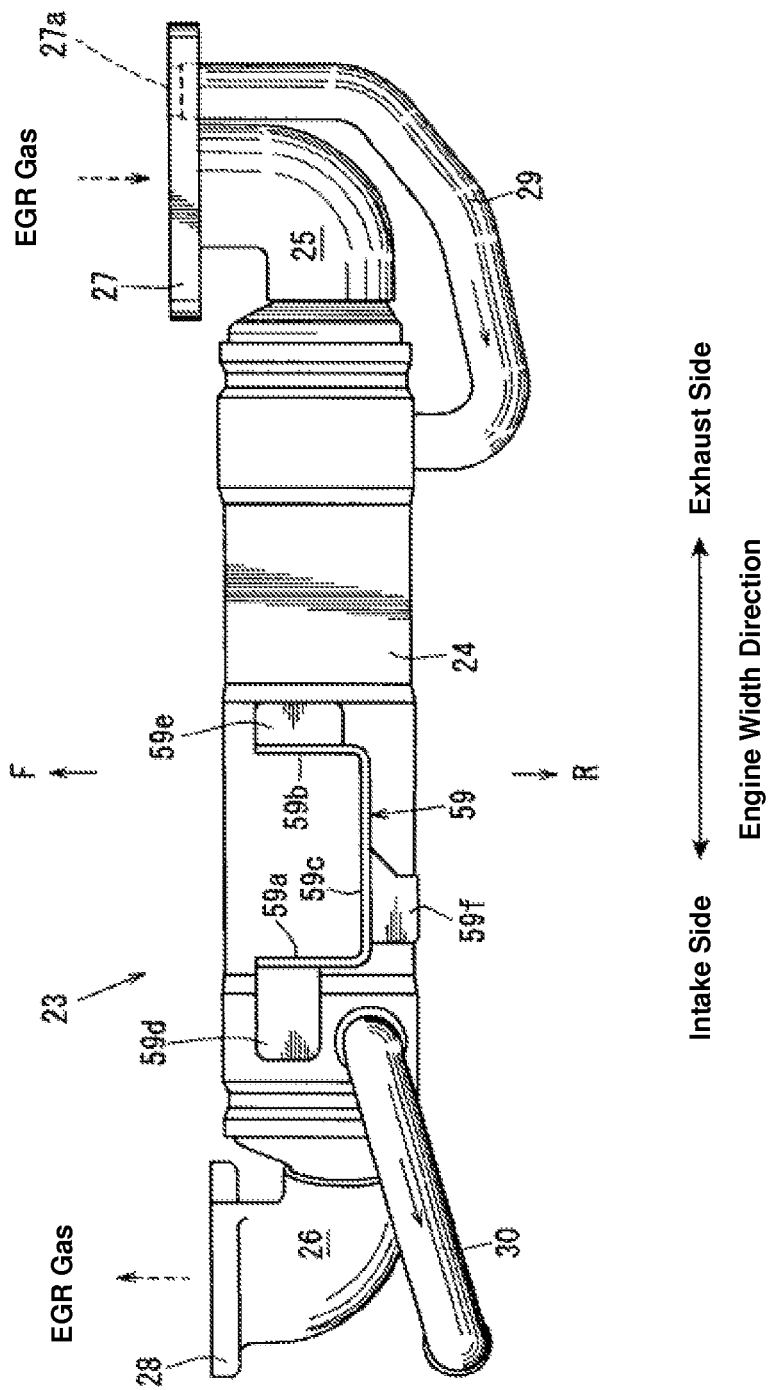
FIG. 4 is a plan view of an EGR cooler.

FIG. 4 is a plan view of the EGR cooler 23 in a state in which the EGR cooler 23 is attached to the cylinder head 11. FIG. 5 is an elevational view of the EGR cooler 23 in the above-described state, when viewed from the engine rear side.

Figure 5:
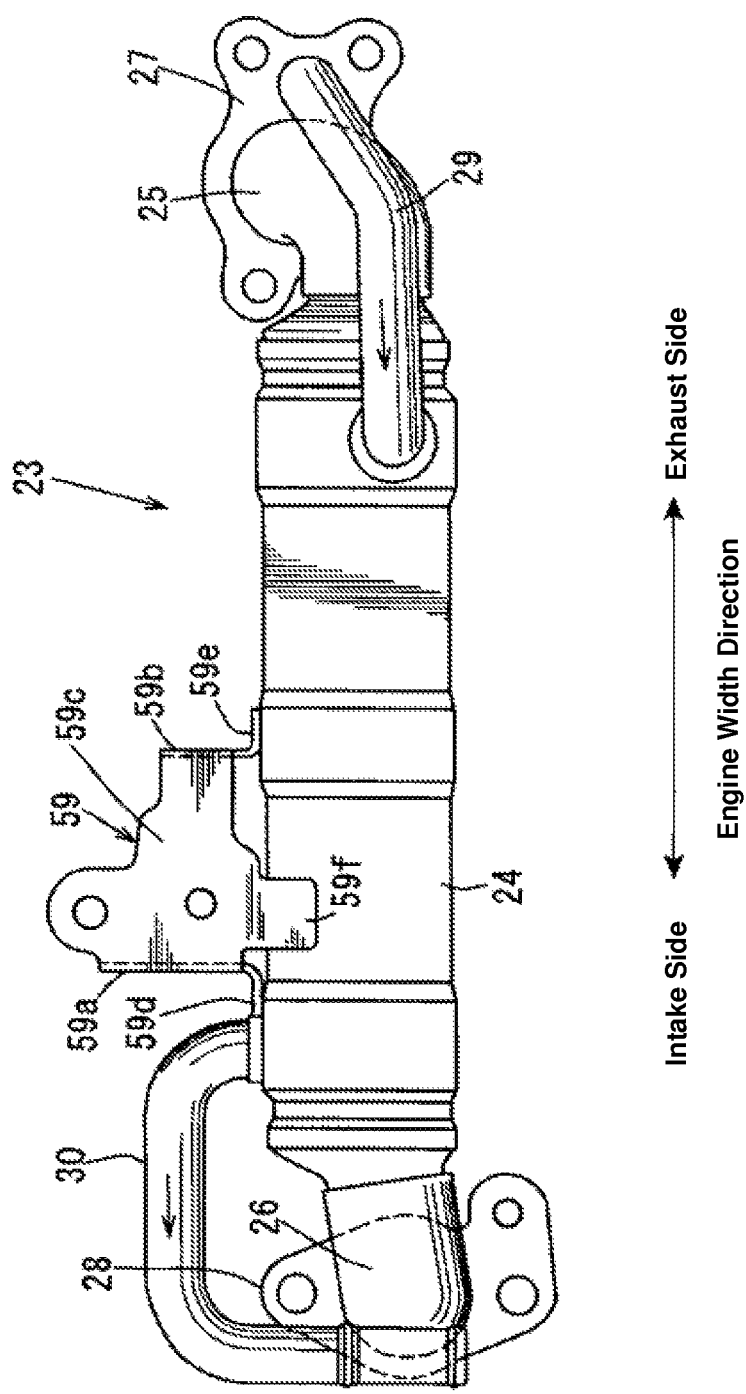
FIG. 5 is an elevational view of the EGR cooler, when viewed from an engine rear side.

The EGR cooler 23 comprises, as shown in FIGS. 4 and 5, a cooler body 24, an EGR-gas introduction pipe (exhaust-gas introduction portion) 25, an EGR-gas discharge pipe (exhaust-gas discharge portion) 26, a cooling-water introduction pipe 29, and a cooling-water discharge pipe 30.

The cooler body 24 cools the EGR gas through its heat exchanging with the cooling water inside that. The cooler body 24 is substantially a rectangular parallelepiped, extending in a specified direction, and configured to introduce the EGR gas from one end thereof and discharge the cooled EGR gas from the other end thereof. As described later, the EGR cooler 23 is provided behind the cylinder head 11 in such a manner that the longitudinal direction of the cooler body 24 matches the width direction of the cylinder head 11.

The EGR-gas introduction pipe 25 is coupled to one end of the cooler body 24, i.e., an upstream end of the cooler body 24, by soldering or the like. The EGR-gas introduction pipe 25 connects to the branch passage 17a and the connecting passage 17 via the opening portion for EGR cooler 18 so as to introduce the EGR gas into the cooler body 24, as specifically described later. The EGR-gas introduction pipe 25 is substantially of an L shape in the plan view.

The EGR-gas discharge pipe 26 is coupled to the other end of the cooler body 24, i.e., a downstream end of the cooler body 24, by soldering or the like, and discharges the EGR gas which has passed through the cooler body 24 to the outside of the cooler body 24. The EGR-gas discharge pipe 26 is substantially of an L shape in the plan view.

Flanges 27, 28 are formed integrally with the EGR-gas introduction pipe 25 and the EGR-gas discharge pipe 26 in front of these pipes 25, 26, respectively. A hole portion 27a is formed at the flange 27 provided at the EGR-gas introduction pipe 25 to penetrate the flange 27.

The cooling-water introduction pipe 29 connects the hole portion 27a and the upstream portion of the cooler body 24. The hole portion 27a connects to the relay water passage 20, and the cooling-water introduction pipe 29 introduces the cooling water from the relay water passage 20 to the cooler body 24 via the hole portion 27a, as specifically described later.

The cooling-water discharge pipe 30 extends from an upper side of the downstream portion of the cooler body 24 to the downstream and discharges the cooling water having passed through the cooler body 24 to the outside of the cooler body 24. The cooling-water discharge pipe 30 is of a gate shape in the elevational view as shown in FIG. 5.

A bracket 59 is coupled to the cooler body 24. This bracket 59 connects the cooler body 24 and an EGR valve for bypass V2 which will be specifically described later. The bracket 59 has side pieces 59a, 59b which extend vertically and longitudinally and face each other in the engine width direction, a rear piece 59c which connects the side pieces 59a, 59b, and EGR cooler support pieces 59d, 59e, 59f which bend at lower portions of the respective pieces 59a, 59b, 59c. The bracket 59 is connected to the cooler body 24 via the EGR cooler support pieces 59d, 59e, 59f fixed to the upper portion of the cooler body 24.

Figure 6:
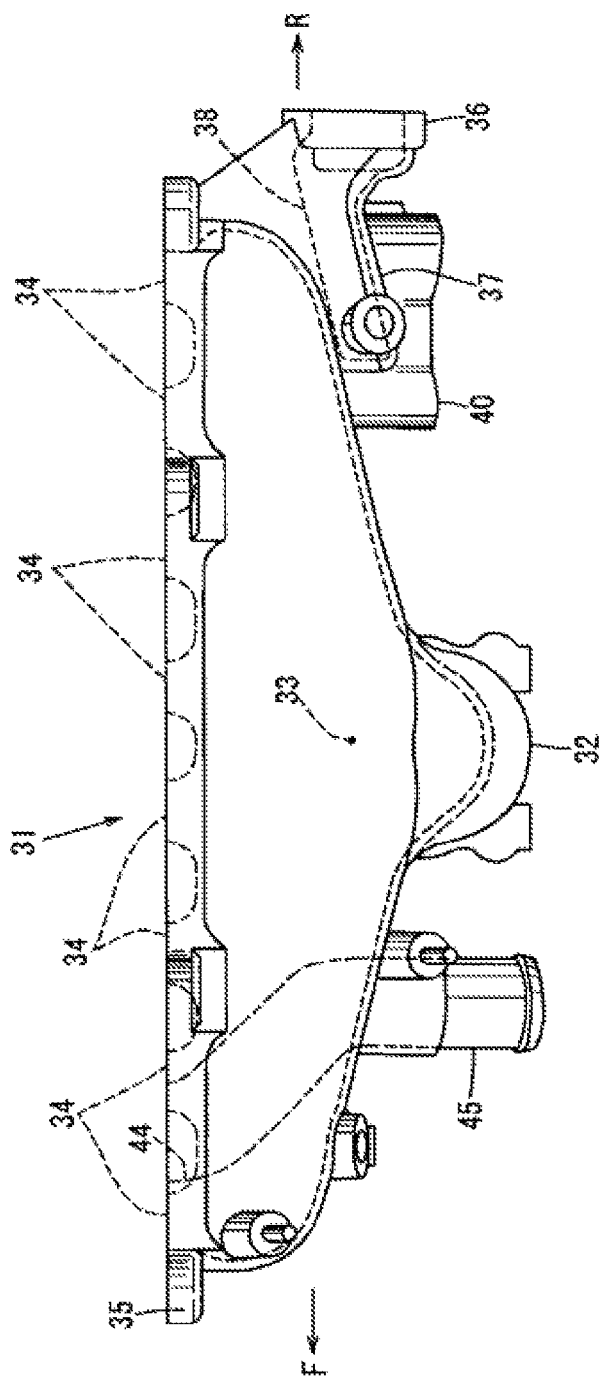
FIG. 6 is a plan view of an intake manifold.
Figure 7:
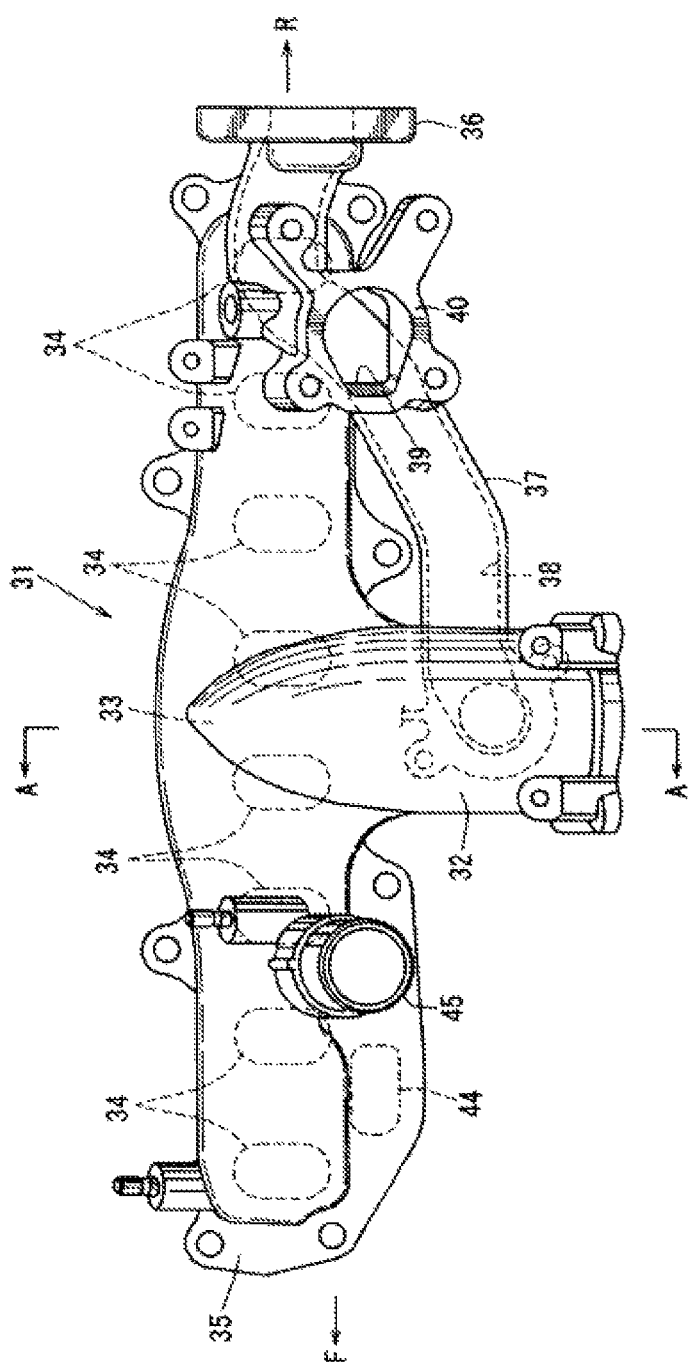
FIG. 7 is an elevational view of the intake manifold.
Figure 8:
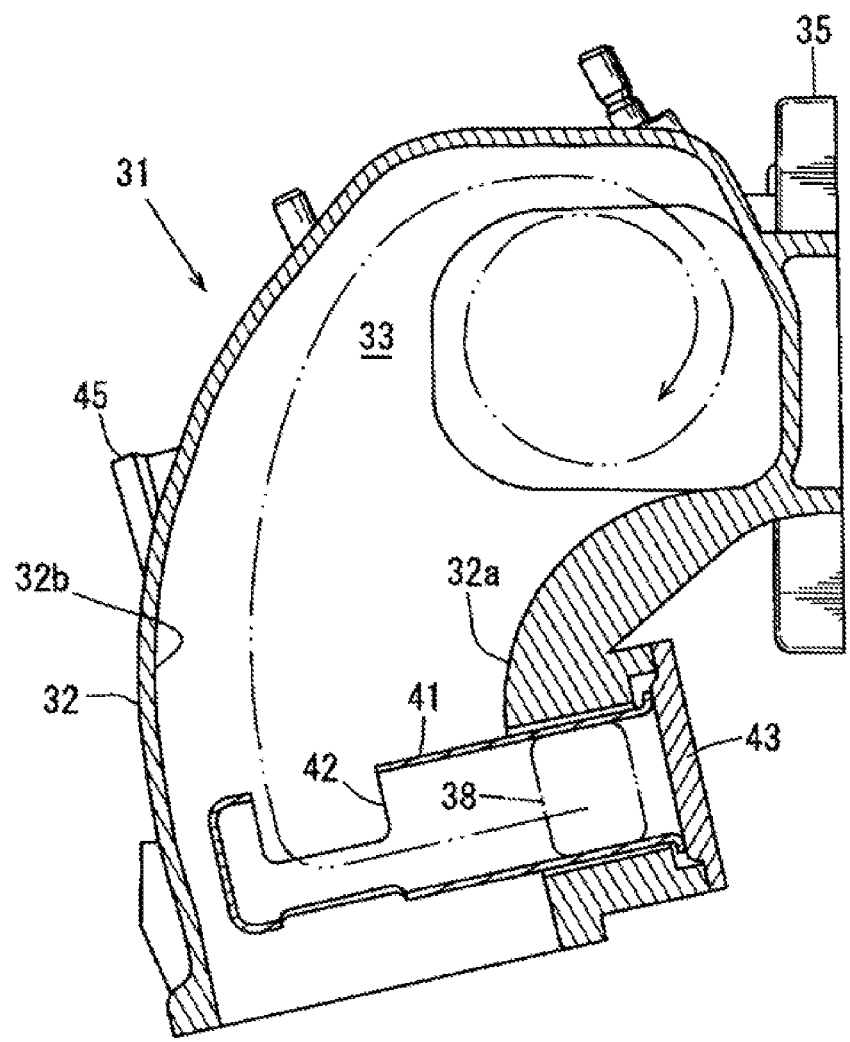
FIG. 8 is a sectional view taken along line A-A of FIG. 7.

The constitution of the intake manifold 31 will be described referring to FIGS. 6, 7 and 8. FIG. 6 is a plan view showing the intake manifold 31 in a state in which the intake manifold 31 is attached to the cylinder head 11. FIG. 7 is an elevational view showing the intake manifold 31 in the above-described state. FIG. 8 is a sectional view taken along line A-A of FIG. 7.

As shown in FIG. 7, the intake manifold 31 is substantially of a T shape in the elevational view. The intake manifold 31 comprises an intake-manifold upstream portion 32, an intake-manifold collective portion 33, and a branch portion 34, which are arranged in order from the upstream. An intake passage is formed inside the intake-manifold upstream portion 32, the intake-manifold collective portion 33 and the branch portion 34 of the intake manifold 31.

Two intake passages are formed inside the branch portion 34 for each cylinder inside the branch portion 34. The intake air flowing down inside the branch portion 34 from the upstream portion 32 is dividedly supplied into the respective cylinders #1, #2, #3 and #4 via the collective portion 33. Specifically, a flange 35 is formed integrally with the intake manifold 31 on the side of the cylinder head 11. Respective downstream ends 34a of the plural intake passages formed inside the branch portion 34 open at the flange 35. These downstream ends 34a connect to the intake ports 14 independently in a state in which the intake manifold 31 is attached to the cylinder head 11.

As shown in FIGS. 6 and 7, a flange 36 is provided at a rear end portion of the intake manifold 31 to be integrally formed with a rear side portion of the branch portion 34.

An EGR-gas passage structural portion 37 is provided between the flange 36 and a specified portion of the upstream portion 32 on the side of the cylinder head 11. The EGR-gas passage structural portion 37 extends forward and downward from the flange 36. The flange 36, the EGR-gas passage structural portion 37, and the intake manifold 31 are cast integrally so as to have a high rigidity. An EGR-gas passage 38 is formed inside the EGR-gas passage structural portion 37 to extend from the flange 36 toward the upstream portion 32 and connect to the intake passages inside the upstream portion 32 via a pipe member 41, which will be specifically described later.

As described later, the EGR-gas passage structural portion 37 connects to the bypass pipe 48 via the EGR valve for bypass V2, and the EGR gas flowing into the bypass pipe 48 from the connecting passage 17 flows into the EGR-gas passage 38 and the intake passages.

A flange 40 which projects toward a direction away from the cylinder head 11 is integrally formed at a portion of the EGR-gas passage structural portion 37 on the side of the flange 36. An inner passage 39 which connects to the EGR-gas passage 38 perpendicularly to the EGR-gas passage 38 is formed inside the flange 40.

As described later, the flange 40 connects to the EGR gas discharge pipe 26 of the EGR cooler 23 via an EGR valve V1 and a connection pipe 51. Accordingly, the EGR gas discharged from the connecting passage 17 and having passed through the EGR cooler 23 flows into the inner passage 39. The EGR gas flows down through the inner passage 39 and then into the EGR-gas passage 38 and the intake passages.

The flanges 36, 40 integrally formed with the EGR-gas passage structural portion 37 have an open angle of 90 degrees between them.

As shown in FIG. 8, at the intake-manifold upstream portion 32 is provided the pipe member 41 which extends from the end portion (right-side portion in FIG. 8) on the side of the cylinder head 11 toward a specified direction which is away from the cylinder head 11, i.e., toward the inside of the upstream portion 32. A base portion of the pipe member 41 connects to the EGR-gas passage 38. An opening portion 42 to discharge the EGR gas flowing in from the EGR-gas passage 38 to the upstream portion 32 is formed at a tip end of the pipe member 41. This opening portion 42 is located on the specified side which is away from the cylinder head 11 (on the left side in FIG. 8, which hereafter will be referred to as the "outside" sometimes) so as to discharge the EGR gas toward the outside of the upstream portion 32 properly.

Herein, an outside curve face 32b of an inner periphery face of the upstream portion 32 has a greater radius of curvature than an inside curve face 32a of the upstream portion 32 which is closer to the cylinder head 11 (on the right side in FIG. 8, which hereafter will be referred to as the "inside" sometimes). Accordingly, the EGR gas which has been discharged from the opening portion 42 toward the outside of the upstream portion 32 moves downward to circle along the outside curve face 32b as shown by a phantom line in FIG. 8. Accordingly, the EGR gas is equally-dividedly supplied into the respective cylinders #1, #2, #3 and #4. A base end portion of the pipe member 41 is plugged with a plug member 43.

Figure 12:
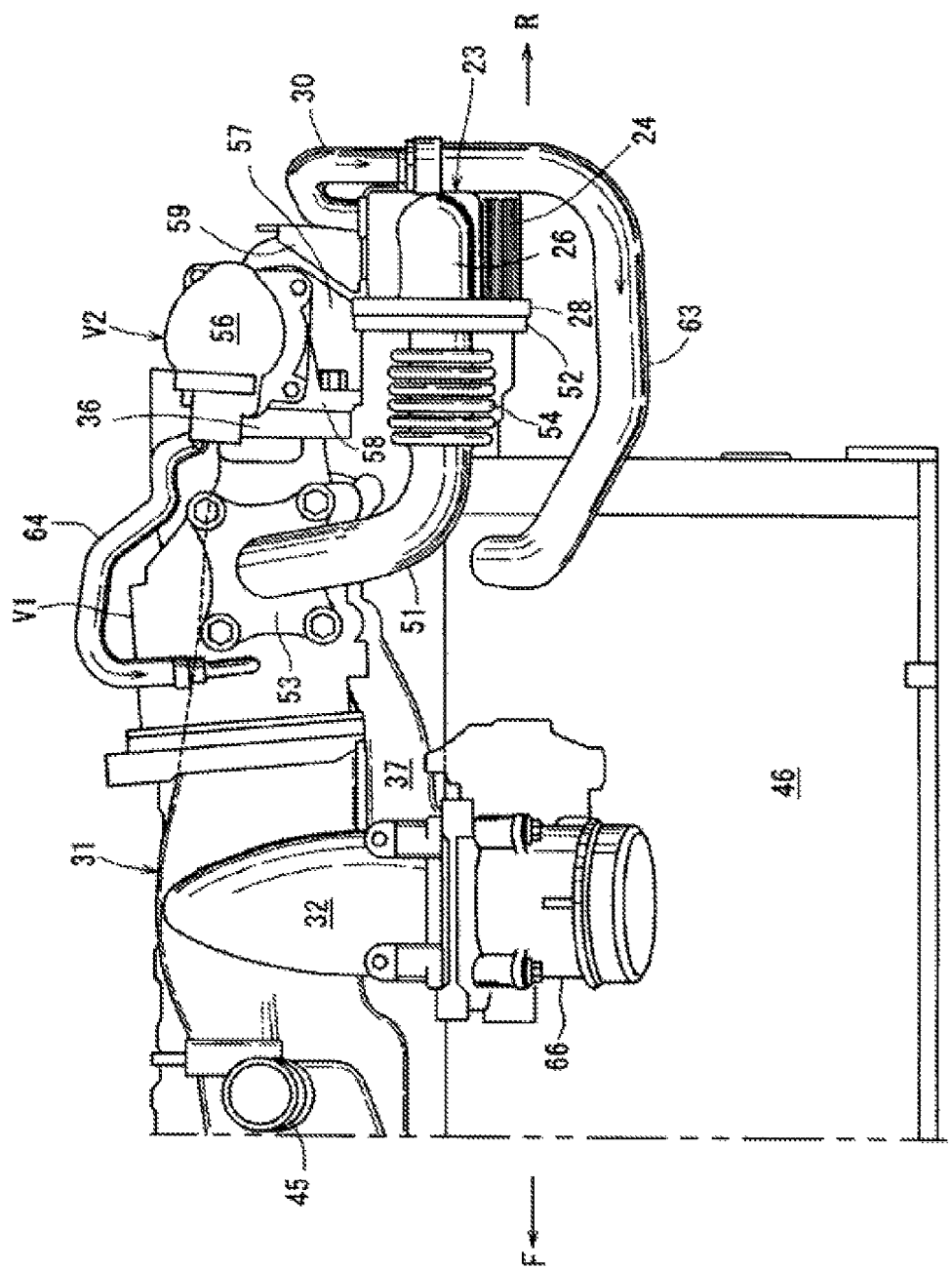
FIG. 12 is a side view showing constitution of an intake side of FIG. 9.

As shown in FIGS. 10 and 12, a throttle body 66 is arranged upstream of the intake manifold 31. In the present embodiment, the opening portion 42 of the pipe member 41 positioned downstream of the throttle body 66, and the EGR gas is introduced into a specified portion of the intake manifold 31 downstream of the throttle body 66. Further, as shown in FIGS. 6 and 7, a cooling-water port 44 and a cooling-water outlet pipe 45 connecting to the cooling-water port 44 are provided at the intake manifold.

Figure 9:
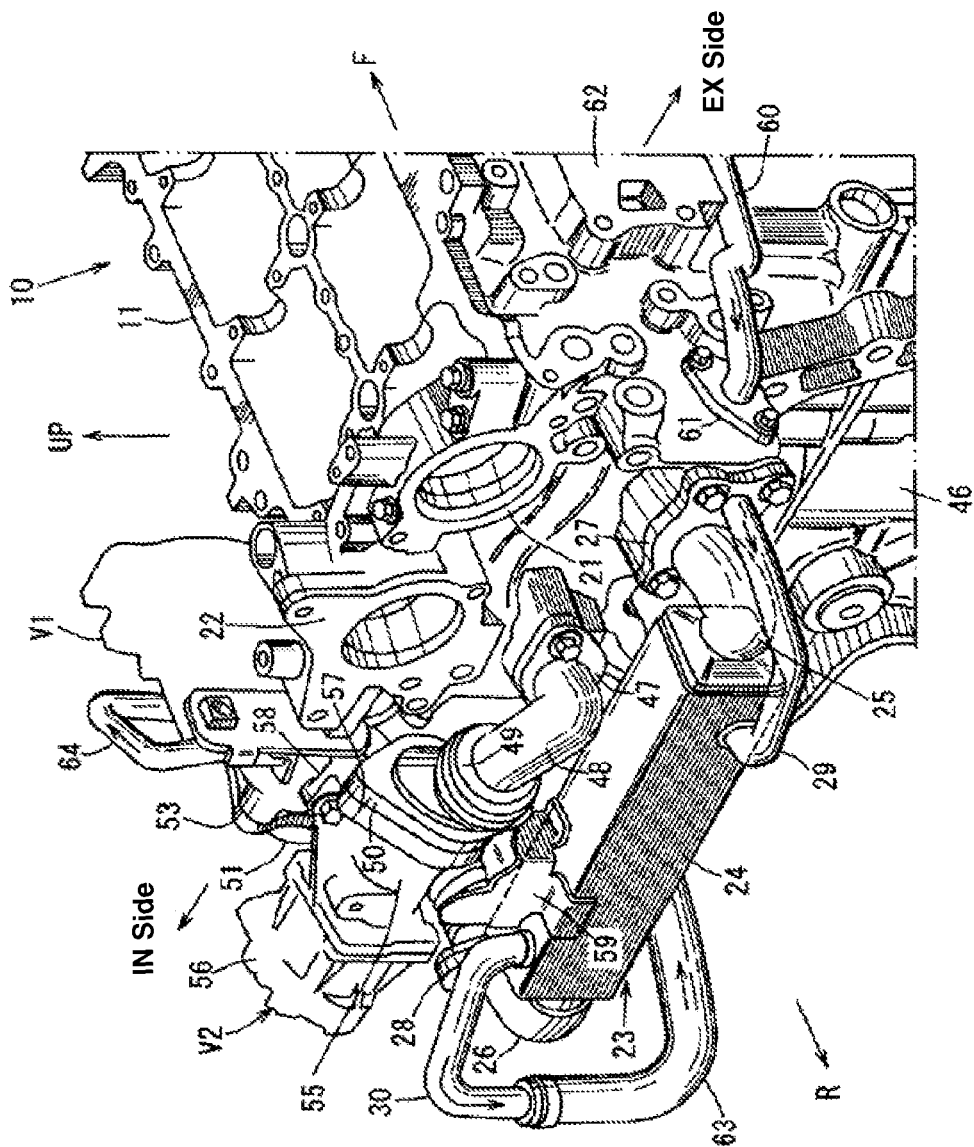
FIG. 9 is a perspective view showing an exhaust gas recirculation device of an engine.
Figure 13:
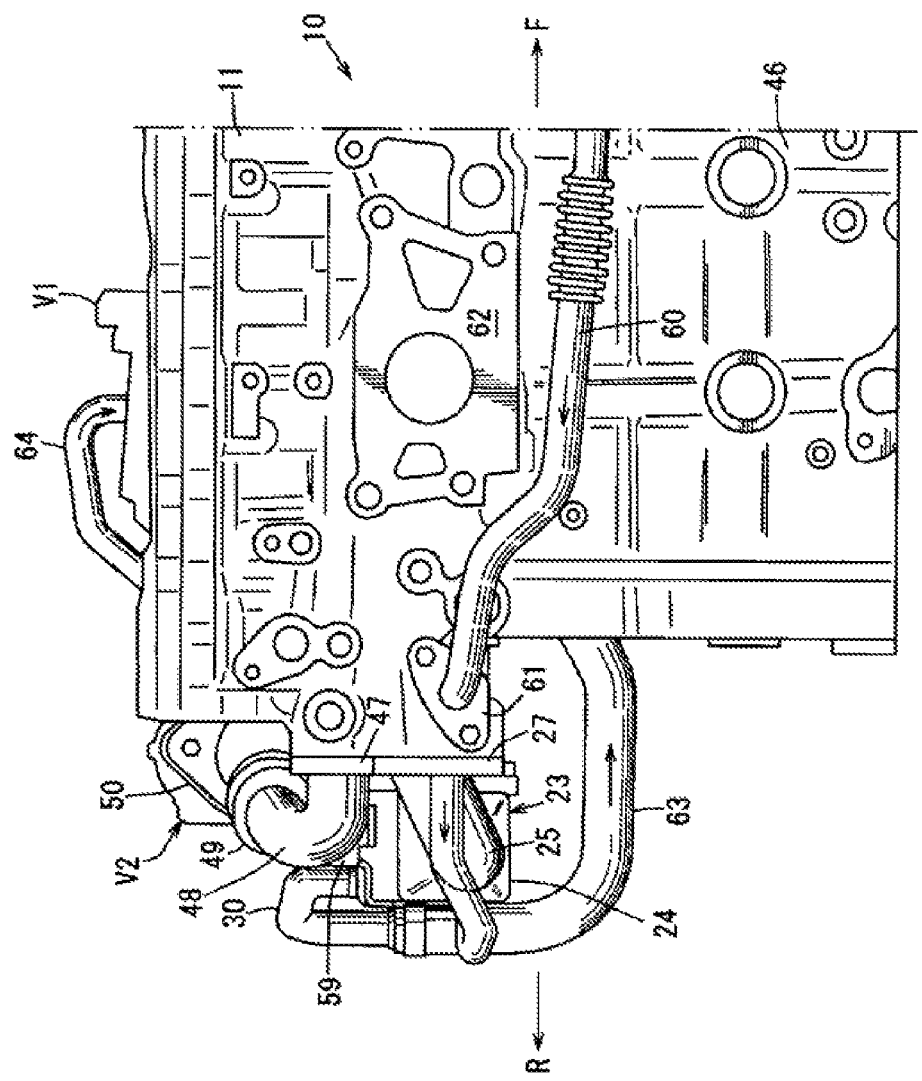
FIG. 13 is a side view showing constitution of an exhaust side of FIG. 9.
Figure 14:
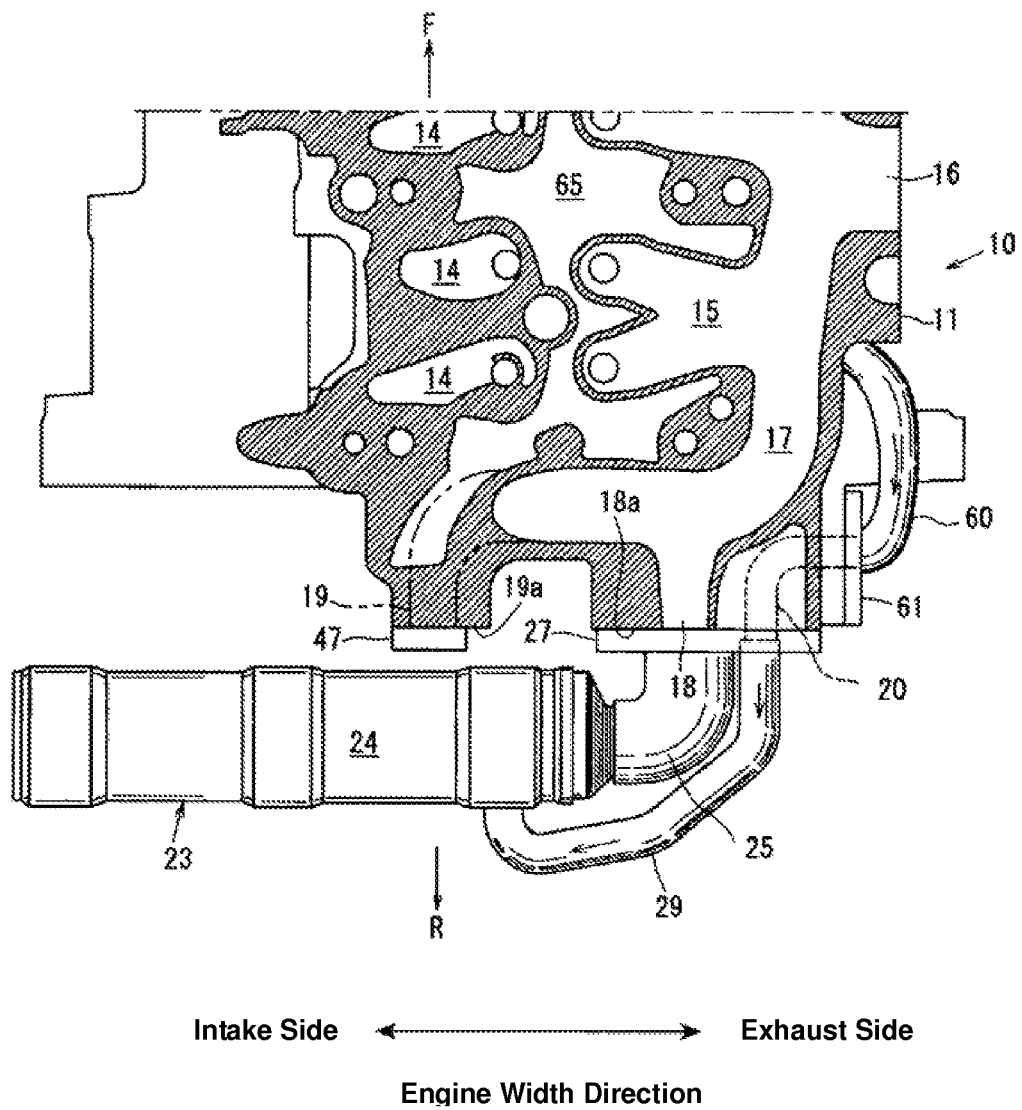
FIG. 14 is a partial plan view showing a major part of the exhaust gas recirculation device.

Next, an assembly structure of the cylinder head 11, the EGR cooler 23, and the intake manifold 31, i.e., a whole constitution of the exhaust gas recirculation device of an engine will be described referring to FIGS. 9-14. FIG. 9 is a perspective view showing the exhaust gas recirculation device of an engine. FIG. 10 is a plan view of the exhaust gas recirculation device of an engine. FIG. 11 is a back view showing the exhaust gas recirculation device of an engine. FIG. 12 is a side view showing the exhaust gas recirculation device, when viewed from the intake side. FIG. 13 is a side view showing the exhaust gas recirculation device, when viewed from the exhaust side. FIG. 14 is a partial plan view of the exhaust gas recirculation device.

First, part of the exhaust gas recirculation device of an engine where the EGR gas flows down will be described.

One end of the EGR cooler 23 is connected to the rear end face of the cylinder head 11. Specifically, the EGR-gas introduction pipe 25 provided at the upstream end of the EGR cooler 23 and the opening portion for EGR cooler 18 formed at the rear end face of the cylinder head 11 are connected to each other via the flanges 18a, 27. This connection provides introduction of the exhaust gas inside the branch passage 17a, i.e., the connecting passage 17, to the EGR-gas introduction pipe 25 via the opening portion for EGR cooler 18.

The EGR cooler 23 is, as shown in FIGS. 11 and 14, arranged behind the cylinder head 11 to extend in the engine width direction from the opening portion for EGR cooler 18. This arrangement suppresses the amount of rearward projection of the EGR cooler 23 from the cylinder head 11. Further, as described previously, the opening portion for EGR cooler 18 is provided at the specified position of the rear end face of the cylinder head 11 on the exhaust side. Accordingly, the amount of projection of the EGR cooler 23 toward the intake side from the cylinder head 11 is suppressed as well. That is, according to the exhaust gas recirculation device of an engine of the present embodiment, the projection amount of the EGR cooler 23 from the cylinder head 11 can be suppressed and the sufficient length of the EGR cooler in the vertical direction can be ensured. Thereby, the sufficient heat-exchanging amount of the EGR cooler 23 can be ensured.

The connection pipe 51 is connected to the EGR-gas discharge pipe 26 provided at the other end of the EGR cooler 23. The cooled EGR gas discharged from the EGR cooler 23 flows into the connection pipe 51 via the EGR-gas discharge pipe 26. Specifically, as shown in FIG. 12, a flange 52 which is formed at one end of the connection pipe 51 is connected to the flange 28 formed at the EGR-gas discharge pipe 26, and the one end of the connection pipe 51 and the EGR-gas discharge pipe 26 are connected to each other via the flanges 52, 28.

At a middle portion of the connection pipe 51 is formed a bellows portion 54 which can expand and deform easily (see FIG. 12). The bellows portion 54 can absorb any assembly error to improve the assembling of the EGR cooler 23. Meanwhile, there is a concern that the EGR cooler 23 may vibrate during the vehicle traveling due to an existence of the bellows portion 54. Accordingly, in the present embodiment, the cooler body 24 of the EGR cooler 23 is connected to the EGR valve for bypass V2 via the bracket 59. This connection can restrain the vibration of the EGR cooler 23 and increase the support rigidity of the EGR cooler 23.

As shown in FIG. 10, the EGR valve V1 of the intake manifold 31 is connected to the other end of the connection pipe 51. Specifically, one end of the EGR valve V1 is directly fixed to a flange 53 which is formed at the other end of the connection pipe 51.

As shown in FIGS. 10 and 12, the other end of the EGR valve V1 is connected to the EGR-gas passage structural portion 37 of the intake manifold 31. Specifically, the other end of the EGR valve V1 is directly attached to the flange 40 formed at the EGR-gas passage structural portion 37.

Part of the exhaust gas inside the connecting passage 17 which has been cooled by the EGR cooler 23 passes through the connection pipe 51 and the EGR valve V1, and then flows into the inner passage 39 of the flange 40. After this, it passes through the EGR-gas passage 38 and the pipe member 41 and is recirculated to the intake passages of the upstream portion 32 of the intake manifold 31.

The EGR valve V1 is located between the connection pipe 51 and the EGR-gas passage structural portion 37 and controls the amount of recirculation of the cooled EGR gas to the EGR-gas passage 38 of the EGR-gas passage structural portion 37 and the intake passages of the intake manifold 31.

One end of the bypass pipe 48 is connected to the rear end face of the cylinder head 11. Specifically, the one end of the bypass pipe 48 and the opening portion for bypass 19 formed at the rear end face of the cylinder head 11 are connected to each other via the flanges 47, 19. This connection provides the introduction of the exhaust gas inside the branch passage 17b and the connecting passage 17 into the bypass pipe 48 via the opening portion for bypass 19.

As shown in FIG. 11, the bypass pipe 48 is arranged in back of the cylinder head 11 and above the EGR cooler 23 and extends in the engine width direction from the opening portion for bypass 19, and the bypass pipe 48 and the EGR cooler 23 extend substantially in parallel to each other. As described previously, the opening portion for bypass 19 is located above the level of the opening portion for EGR cooler 18. Accordingly, the bypass pipe 48 is arranged above the EGR cooler 23 without forming any complex path. Thus, since the EGR cooler 23 and the bypass pipe 48 are arranged vertically, the amount of rearward projection of the EGR cooler 23 and the bypass pipe 48 can be suppressed properly, so that the EGR cooler 23 and the bypass pipe 48 can be arranged compactly.

An easily-expandable-and-deformable bellows portion 49 is provided at the middle portion of the bypass pipe 48. This bellows portion 49 absorbs any manufacturing error of the bypass pipe 48 to improve assembling of the bypass pipe 48.

As shown in FIGS. 10 and 11, the EGR valve for bypass V2 is connected to the other end of the bypass pipe 48. Specifically, the EGR valve for bypass V2 comprises a valve portion 55 which is equipped with two flanges 57, 58 having an open angle of 90 degrees between them and an actuator portion 56. The upstream flange 57 of the EGR valve for bypass V2 and the flange 50 provided at the other end of the bypass pipe 48 are fastened so that the EGR valve for bypass V2 is connected to the other end of the bypass pipe 48 via the flanges 57, 58.

The above-described EGR valve for bypass V2 also connects to the EGR-gas passage structural portion 37 of the intake manifold 31. Specifically, the downstream flange 58 of the EGR valve for bypass V2 and the upstream flange 36 of the EGR-gas passage structural portion 37 are fixed to each other, so that the EGR valve for bypass V2 is connected to the EGR-gas passage structural portion 37 via these flanges 58, 36.

As described above, part of the exhaust gas inside the connecting passage 17 passes through the opening portion for bypass 19, the bypass pipe 48, the EGR valve for bypass V2, and the EGR-gas passage 38, without passing through the EGR cooler 23, and is recirculated to the EGR-gas passage 38 of the EGR-gas passage structural portion 37 and the intake passages of the intake manifold 31, keeping its high temperature. The EGR valve for bypass V2 is located between the bypass pipe 48 and the EGR-gas passage structural portion 37, and controls the amount of the high-temperature EGR gas, not being cooled, which is recirculated into the EGR-gas passage 38 of the EGR-gas passage structural portion 37 and the intake passages.

Herein, the opening portion for bypass 19 is provided at the intake-side portion of the rear end face of the cylinder head 11, and the distance between the opening portion for bypass 19 and the intake manifold 31 is set to be short. Accordingly, the temperature lowering of the EGR gas between the opening portion for bypass 19 and the intake manifold 31 is restrained, so that the high temperature of the EGR gas recirculed to the intake passages can be maintained.

As descried above, among the EGR cooler 23, the connection pipe 51, the EGR valve V1, the bypass pipe 48 and the EGR valve for bypass V2, the other portions than the EGR cooler 23 and the one end of the bypass pipe 48 which are fixed to the cylinder head 11 are attached to the intake manifold 31 rigidly without being supported at the engine body 10 via any support member, such as brackets.

Next, part of the exhaust gas recirculation device of an engine where the cooling water flows will be described. FIGS. 9-14 show the flowing direction of the cooling water by solid lines.

As shown in FIGS. 13 and 14, an upstream water passage 60 is formed along the side face of the exhaust-side portion of the cylinder block 46. The cooling water flowing inside the cylinder block 46 is introduced into the upstream water passage 60. A relay water passage 20 which is of an L shape in the plan view is formed inside a rear portion of the cylinder head 11. One end of the relay water passage 20 opens at the exhaust-side side face of the cylinder head 11, and the other end of the relay water passage 20 opens at the rear end face of the cylinder head 11. The upstream water passage 60 connects to an opening portion of one end of the relay water passage 20 via a flange 61 so that the cooling water inside the upstream water passage 60 can flow into the relay water passage 20. The other end of the relay water passage 20 opens at the rear end face of the cylinder head 11. An opening of the relay water passage 20 opening at the rear end face of the cylinder head 11 connects to the above-described cooling-water introduction pipe 29 via the hole portion 27a of the flange 27 formed at the EGR-gas introduction pipe 25 so that the cooling water inside the relay water passage 20 can be introduced into the cooling-water introduction pipe 29 and the cooler body 24.

According to the present embodiment, as described above, the relay water passage 20 where the cooling water flows inside the cylinder head 11 is provided, so that piping can be made properly simpler compared to a case in which some pipe is provided, bypassing an exhaust device, such as a supercharger, and the support rigidity of piping can be increased.

Herein, as shown in FIG. 13, an attachment seat 62 to attach some exhaust-gas purification device, such as a turbocharger or DPF (Diesel Particulate Filter), is formed at the exhaust-side side face of the cylinder head 11, and the supercharger, not illustrated, is attached to this attachment seat 62, so the upstream water pipe 60 is arranged below the attachment seat 62.

As shown in FIG. 11, the cooling water which has conducted heat exchanging with the high-temperature EGR gas at the EGR cooler 23 returns to the water-pump side from the cooling-water discharge pipe 30 of the EGR cooler 23 via a hose 63.

Herein, as shown in FIGS. 9-13, a cooling-water delivery pipe 64 to take out the cooling water from the cylinder head 11 is provided at the cylinder head 11.

According to the exhaust gas recirculation device of an engine described above, the EGR valve V1 opens when the temperature of the engine body 1 is high, so that part of the exhaust gas inside the connecting passage 17 flows into the EGR cooler 23 through the opening portion for EGR cooler 18 and is cooled.

The cooled EGR gas flows down through the connection pipe 51, the EGR-gas passage 38 of the EGR-gas passage structural portion 37, and the like, and then flows out from the opening portion 42 of the pipe member 41 to the upstream portion 32 of the intake manifold 31. Herein, the EGR gas together with the intake air is recirculated from the downstream ends 34a of the intake passages formed inside the branch portion 34 to the intake ports 14 . . . of the respective cylinders #1, #2, #3 and #4 (see FIGS. 1 and 2) almost equally. Thus, when the temperature of the engine body 10 is high, the cooled EGR gas mixes with the new intake air, so that the intake temperature can be prevented from being improperly high, thereby ensuring the sufficient amount of intake air.

Meanwhile, when the engine temperature is low at the engine start or the like, the EGR valve for bypass V2 opens, so that part of the exhaust gas inside the connecting passage 17 flows into the bypass pipe 48 through the opening portion for bypass 19.

The EGR gas flowing into the bypass pipe 48 flows down through the EGR valve for bypass V2, the EGR-gas passage 38 of the EGR-gas passage structural portion 37, and the like, keeping its high temperature without passing through the EGR cooler 23, and then flows out from the opening portion 42 of the pipe member 41 to the upstream portion 32 of the intake manifold 31. Herein, like the above-described case of the high engine temperature, the EGR gas together with the intake air is recirculated from the downstream ends 34a of the intake passages formed inside the branch portion 34 to the intake ports 14 . . . of the respective cylinders #1, #2, #3 and #4 (see FIGS. 1 and 2) almost equally. Thus, when the temperature of the engine is low, the high-temperature EGR gas mixes with the new intake air, so that the intake temperature can increase properly to promote vaporization and atomization of fuel, thereby stabilizing combustion.

According to the exhaust gas recirculation device of an engine of the present embodiment described above, the connecting passage 17 and the branch passages 17a, 17b which branch from the exhaust passage (the exhaust ports 15) are formed inside the cylinder head 11, and the EGR cooler 23 and the bypass pipe 48 are respectively connected to the opening portions 18, 19 of the branch passages 17a, 17b which are formed at the rear end face of the cylinder head 11. Accordingly, the size of the device can be made smaller, compared to a case in which the pipes to respectively connect the exhaust passage and the EGR cooler 23 and the bypass pipe 48 are provided outside the cylinder head 11.

Further, the opening portion for EGR cooler 18 connecting to the EGR cooler 23 is further away from the intake manifold 31, compared to the opening portion for bypass 19 connecting to the bypass pipe 48. Thereby, the distance from the opening portion for EGR cooler 18 to the intake manifold 31 can be properly long and thus the large volume of the EGR cooler provided between these can be ensured. This can ensure the sufficient heat-exchanging amount of the EGR cooler, that is, the sufficient cooling of the EGR, with the small-sized device. Further, the distance from the opening portion for bypass 19 to the intake manifold 31 can be properly short and thus the volume of the bypass pipe 48 arranged between these can be properly small. This arrangement can suppress the amount of radiation of heat of the EGR gas flowing down through the bypass pipe 48, so that the temperature of the EGR gas flowing through the bypass pipe 48 can be kept properly high, with the small-sized device.

Moreover, the EGR cooler 23 extends along the rear end face of the cylinder head 11 in back of the cylinder head 11, so that the rearward projection amount of the EGR cooler 23 is suppressed.

Particularly, the EGR cooler 23 extends in the width direction of the engine body 10. Thus, the EGR cooler 23 can be arranged compactly at the upper portion of the engine body 10. Herein, in case the EGR cooler 23 is disposed in the width direction, it may be difficult to ensure the distance of the EGR cooler 23 in the width direction. However, since the opening portion for EGR cooler 18 is provided at the exhaust-side portion of the rear end face of the cylinder head 11 as described above, the sufficient distance and thus the sufficient volume of heat exchanging of the EGR cooler 23 can be ensured.

Also, the cooler body 24 of the EGR cooler 23 is a type in which the EGR gas is introduced into it from the EGR-gas introduction pipe 25 formed at one end and the cooled EGR gas is discharged from the EGR-gas discharge pipe 26 formed at the other end. Accordingly, the EGR cooler 23 extends in the width direction, so that the distance between the EGR-gas discharge pipe 26 and the intake manifold 31 can be properly short. This can simplify the piping structure.

Further, the bypass pipe 48 is arranged above the EGR cooler 23 in parallel to the EGR cooler 23. Accordingly, the bypass pipe 48 and the EGR cooler 23 can be arranged compactly. In particular, the opening portion for EGR cooler 18 is provided above the opening portion for bypass 19. Accordingly, the EGR cooler 23 and the bypass pipe 48 are arranged in parallel to each other with a simple piping.

Moreover, the EGR-gas passage structural portion 37 is formed integrally at the intake manifold 31, and the EGR cooler 23 and the opposite end portion of the bypass pipe 48 to the side fixed to the cylinder head 11 are connected to the EGR-gas passage structural portion 37 via the connection pipe 51, the EGR valve V1 and the EGR valve for bypass V2. That is, the EGR cooler 23 and the other end of the bypass pipe 48 are rigidly attached to the intake manifold 31, without being supported at the engine body 10 via any support member, such as bracket. Thereby, the support rigidity of the EGR cooler 23 and the bypass pipe 48 can be kept properly high and their support structure can be made simple.

The present invention should not be limited to the above-described embodiment and modification, and any other modifications and improvements may be applied within the scope of a spirit of the present invention.

For example, while the exhaust gas recirculation device of an engine of the above-described embodiment is applied to the inline four-cylinder engine, any other inline multi-cylinder type of engine may be used.

Further, the above-described bypass pipe 48 may be arranged below the EGR cooler 23.

Moreover, while the EGR cooler 23 of the above-described embodiment is the type in which it extends in the specified direction, the EGR gas is introduced from the one end of that, and the cooled EGR gas is discharged from the other end of that, it is not limited to this type. For instance, the EGR cooler 23 may be a type in which a portion to introduce the EGR gas and another portion to discharge the EGR gas are provided at one end of that.

Also, the end portion of the EGR cooler 23 connecting to the cylinder head 11 and the opposite end portion may be supported at the engine body 10 via brackets or the like.

What is claimed is:

1. An exhaust gas recirculation device of an engine, which recirculates part of exhaust gas discharged from an engine body having plural cylinders arranged in line in an engine-body longitudinal direction to an intake manifold arranged on one side of the engine body in an engine-body width direction, comprising:
an exhaust passage provided inside a cylinder head of the cylinder body;

a connecting passage provided inside the cylinder head to connect to and extend rearward from the exhaust passage;

an EGR cooler cooling part of the recirculated exhaust gas to the intake manifold from the exhaust passage, the EGR cooler including an EGR-gas introduction pipe to introduce the exhaust gas into an EGR cooler body provided inside the EGR cooler, the EGR-gas introduction pipe having a connecting flange integrally formed at an upstream end thereof;

a bypass pipe bypassing the EGR cooler and recirculating the exhaust gas from the exhaust passage to the intake manifold, the bypass pipe having a connecting flange integrally formed at an upstream end thereof, wherein said connecting passage branches inside the cylinder head into two branch passages, which open at different positions on a rear end face, in the engine-body longitudinal direction, of the cylinder head, the connecting flange of the EGR-gas introduction pipe of said EGR cooler is connected to the rear end face of the cylinder head so as to connect to one of opening portions of said branch passages for introducing the exhaust gas flowing through the connecting passage into the EGR cooler body, the connecting flange of said bypass pipe is connected to the rear end face of the cylinder head so as to connect to the other of opening portions of said branch passages for flowing the exhaust gas flowing through the connecting passage, bypassing the EGR cooler, and said opening positions of the opening portions where the two branch passages open on the rear end face of the cylinder head are configured such that said one of the opening portions is located further away from the intake manifold, compared to said other of the opening portions, and at a lower level than the other of the opening portions so that the EGR cooler extends in the engine-body width direction at a position behind the rear end face of the engine body and below said bypass pipe.

2. The exhaust gas recirculation device of an engine of claim 1, wherein said EGR cooler extends in the engine-body width direction from a vicinity of said one of the opening portions toward the intake manifold.

3. The exhaust gas recirculation device of an engine of claim 1, further comprising an EGR-gas passage structural portion formed at the intake manifold connected to the engine body, and said EGR cooler and said bypass pipe are supported at said EGR-gas passage structural portion.

4. The exhaust gas recirculation device of an engine of claim 1, wherein said EGR cooler is a water-cooled type of EGR cooler, in which the exhaust gas introduced into the EGR cooler body thereof is cooled by cooling water introduced therein, the EGR cooler further includes a cooling-water introduction pipe to introduce the cooling water into the EGR cooler body thereof, said connecting flange of the EGR-gas introduction pipe has a hole portion which is provided to penetrate the connecting flange, said hole portion is configured to connect to a water passage formed inside the cylinder head when the connecting flange of the EGR-gas introduction pipe is connected to the cylinder head, and said cooling-water introduction pipe connects said hole portion and the EGR cooler body so as to introduce the cooling water from the water passage into the EGR cooler body via the hole portion.

* * * * *